No. 884,349. PATENTED APR. 7, 1908.
I. BARKER.
NUT LOCK.
APPLICATION FILED NOV. 2, 1907.
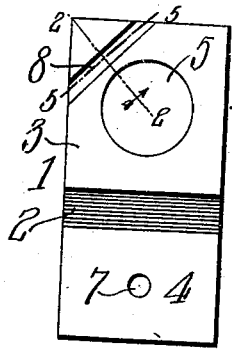
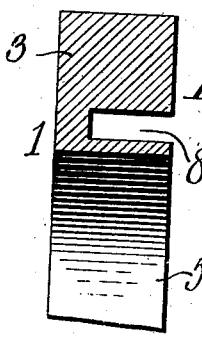
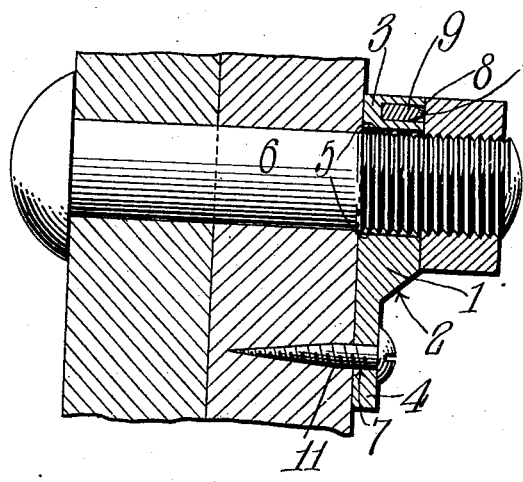
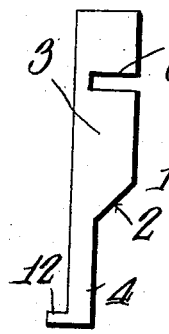
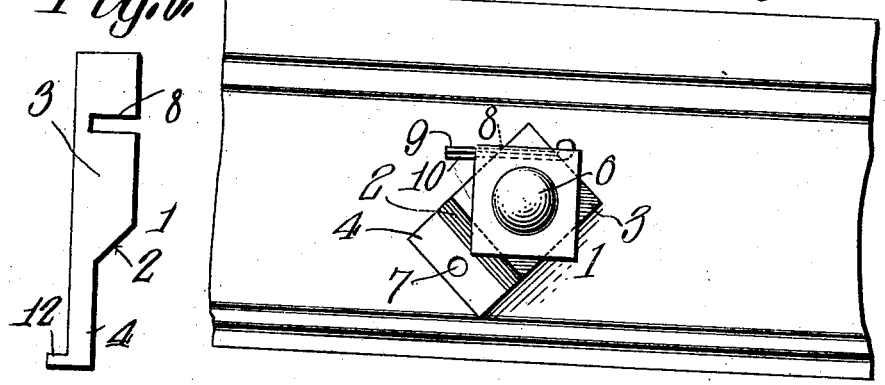
Witnesses
Irving Barker, Inventor
By C. A. Snow & Co.
Attorneys

UNITED STATES PATENT OFFICE.

IRVING BARKER, OF SPRINGFIELD, ILLINOIS, ASSIGNOR OF ONE-HALF TO ALFRED BOOTH, OF SPRINGFIELD, ILLINOIS.

NUT-LOCK.

No. 884,349.  Specification of Letters Patent.  Patented April 7, 1908.

Application filed November 2, 1907. Serial No. 400,389.

*To all whom it may concern:*

Be it known that I, IRVING BARKER, a citizen of the United States, residing at Springfield, in the county of Sangamon and State of Illinois, have invented a new and useful Nut-Lock, of which the following is a specification.

This invention relates to a nut lock; and has for its object to provide a simple means for preventing a nut from rotating on a bolt after said nut has been screwed tightly thereon.

With this object in view the invention comprises certain novel construction, combination and arrangement of parts hereinafter described and claimed.

In the accompanying drawings: Figure 1 is a face view of the invention. Fig. 2 is a sectional view, enlarged, on the line 2—2, Fig. 1. Fig. 3 is a view in section showing the invention applied to a bolt and nut and bearing against a wooden surface. Fig. 4 is an elevation showing the invention applied to a rail joint. Fig. 5 is a sectional view on the line 5—5. Fig. 6 is a side view of a modified form of the washer.

Similar reference numerals are used for the same parts on all the figures.

This device, which is in the nature of a washer 1, is made of metal preferably rectangular in form and greater in one superficial dimension than the other. The washer is divided transversely into two parts by an inclined face 2, making one end 3 thicker than the other end 4. The washer may however be of uniform thickness. Through the center of the thick end 4 is bored a hole 5 of sufficient size to easily slip on a bolt 6. A small screw hole 7 is made through the thin end 4 wherever convenient.

Across the outer face of the thick end 3 of the washer is a slot 8, extending more than half way through and preferably straight. From choice, the slot 8 is cut across an outer corner of the washer at an angle of forty-five degrees to the edges, but it is to be understood that the position of the slot and its angular direction may be changed if found convenient, provided the ends of the slot open on two edges of the washer so that a locking key 9 may be driven into the slot and project at each end. The bottom of the slot 8 is very slightly inclined from one end to the other. The locking key 9 is made long enough to project from each end of the slot 8 when driven home and thick enough to fill it and slide easily therein. Its outer edge 10 is beveled and sharpened, but its inner edge is flat and narrower at one end than at the other, the angle between the two edges is the same as that between the face of the washer 1 and the base of the slot, so that when the key 9 is within the slot, the sharp edge 10 will lie parallel with said washer face, and as said key is moved along the slot the inclined bearing surfaces will cause the sharpened edge 10 of the key to move outwardly.

When the washer 1 is used, it is slipped over a bolt in the same way as an ordinary circular washer and the nut screwed on the bolt as tightly as possible, a portion of said nut extending over the slot. The key is now inserted in the slot with its sharp edge towards the nut and pushed in as far as it will go. It is then driven in further, the sharp edge 10 cutting a slight furrow in the bottom of the nut but sufficiently deep to prevent the nut turning. The narrower end of the key is now bent to prevent its withdrawal, and to prevent the washer turning, a nail or screw 11 is put through the hole 7 in the thin end 4 of the washer, see Fig. 3, if the material against which the washer bears is wood or other like material capable of taking a screw or nail. If used for fastening rail joints, as shown in Fig. 4, the washer will be so disposed that a corner of the thin end 4 will strike the base flange of the rail if any attempt is made to take off the nut.

At certain times it may not be possible to use a screw to prevent the washer turning nor a flange for it to strike against. To overcome this difficulty, a narrow flange 12 projects rearwardly from the lower edge of the thin end of the washer as clearly shown in Fig. 6.

Having described my invention what I claim as new and desire to secure by Letters-Patent is:—

1. A nut lock comprising a washer having a slot in one face extending across the same between the bolt hole and its edge, the bottom of said slot being inclined, and a key longer than said slot having a sharp edge and a flat edge inclined to said sharp edge adapted to slide in said slot and cut a furrow in the nut bearing against said washer and extending over said slot.

2. A nut lock comprising a rectangular washer having one end thicker than the other, a bolt hole in the thick end, a slot in the face of said end extending in a straight line from one edge of said washer to another, and a thin key longer than the slot having a flat edge and a sharp edge adapted to slide in said slot and cut a furrow in the nut bearing against said washer and extending over the slot, the bottom of said slot and the key being inclined.

3. A washer for a nut of rectangular form, thicker at one end than at the other with a bolt hole through the thicker end, said thick end having an angular slot in the face thereof outside said bolt hole and extending from one edge of the washer to another, the bottom of said slot being inclined, and a flange on the lower end of the washer extending rearwardly.

4. A washer for a nut lock of rectangular form thicker at one end than at the other with a bolt hole through the thicker end, means at the thin end to prevent the washer rotating when in use, said thick end having an angular slot in the face thereof outside said bolt hole and extending from one edge of the washer to another, the bottom of said slot being inclined.

5. A washer for a nut lock having a slot in one face extending across the same between the central opening and the edge, the side walls of said slot being parallel to each other and the bottom slightly inclined throughout its entire length.

6. A rectangular washer for a nut lock having a slot in one face extending across the corner between adjacent edges of the washer, the side walls of said slot being parallel to each other and the bottom slightly inclined throughout its entire length.

In testimony that I claim the foregoing as my own, I have hereto affixed my signature in the presence of two witnesses.

IRVING BARKER.

Witnesses:
  W. J. AURELIUS,
  EDWIN A. WILSON.